(12) United States Patent
Reeves

(10) Patent No.: US 9,984,634 B2
(45) Date of Patent: May 29, 2018

(54) DISPLAY SYSTEMS AND METHODS

(71) Applicant: FlexEnable Limited, Cambridge, Cambridgeshire (GB)

(72) Inventor: Will Reeves, Willingham (GB)

(73) Assignee: Flexenable Limited, Cambridge, Cambridgeshire (GB)

( * ) Notice: Subject to any disclaimer, the term of this patent is extended or adjusted under 35 U.S.C. 154(b) by 213 days.

(21) Appl. No.: 15/027,421

(22) PCT Filed: Oct. 29, 2014

(86) PCT No.: PCT/GB2014/053213
§ 371 (c)(1),
(2) Date: Apr. 5, 2016

(87) PCT Pub. No.: WO2015/063477
PCT Pub. Date: May 7, 2015

(65) Prior Publication Data
US 2016/0240148 A1 Aug. 18, 2016

(30) Foreign Application Priority Data

Oct. 30, 2013 (GB) .................................. 1319124.2

(51) Int. Cl.
*G09G 3/34* (2006.01)
*G09G 3/20* (2006.01)
*G02F 1/167* (2006.01)

(52) U.S. Cl.
CPC ............. *G09G 3/344* (2013.01); *G02F 1/167* (2013.01); *G09G 3/2003* (2013.01); *G09G 3/348* (2013.01);
(Continued)

(58) Field of Classification Search
CPC ......................................... G09G 3/3433–3/348
See application file for complete search history.

(56) References Cited

U.S. PATENT DOCUMENTS 6,750,875 B1 6/2004 Keely, Jr. et al.
8,179,365 B2 * 5/2012 Lee ........................ G09G 3/344
345/107
(Continued)

FOREIGN PATENT DOCUMENTS

EP 2388773 A2 11/2011
GB 2490035 A 10/2012
(Continued)

OTHER PUBLICATIONS

UK Search Report for Application No. GB1319124.2 dated Mar. 26, 2014 in 1 page.
(Continued)

*Primary Examiner* — Patrick F Marinelli
(74) *Attorney, Agent, or Firm* — Knobbe Martens Olson & Bear LLP

(57) ABSTRACT

A method of displaying color data on an electronic paper display is displayed. The method comprises providing an electronic paper display having display pixels at a display pixel pitch and providing a color filter for said display. Said color filter comprises groups of colored filter elements, each said colored filter element having one of a plurality of different colors, wherein each group of colored filter elements defines a pattern of said colored filter elements. In said pattern a colored filter element overlies an integral number, n, of said display pixels, where n is two or more. The method also comprises providing color image data defining a plurality of color image planes, one for each of said different colors. Data in a said color image plane comprises image pixel data defining values for image pixels corresponding to said display pixels. The method also comprises selecting, from said data in each said color image plane, data for image pixels corresponding to display pixels over which the filter elements of the respective color for the color plane lie; and using said selected data to drive said
(Continued)

electronic paper display; wherein on said display a rate of spatial variation of said selected data for said image pixels is less than said display pixel pitch.

16 Claims, 17 Drawing Sheets

(52) U.S. Cl.
CPC . *G09G 2300/08* (2013.01); *G09G 2320/0613* (2013.01); *G09G 2340/0457* (2013.01)

(56) References Cited

U.S. PATENT DOCUMENTS

| 8,659,540 | B2* | 2/2014 | Wang | G09G 3/344 |
| | | | | 345/107 |
| 9,514,691 | B2* | 12/2016 | Reeves | G09G 3/344 |
| 2010/0271380 | A1* | 10/2010 | Low | G09G 3/344 |
| | | | | 345/545 |
| 2011/0169869 | A1* | 7/2011 | Wang | G09G 3/344 |
| | | | | 345/690 |
| 2011/0310461 | A1* | 12/2011 | Bouchard | G02F 1/167 |
| | | | | 359/296 |
| 2012/0147314 | A1 | 6/2012 | Yoshizawa et al. | |
| 2012/0262496 | A1* | 10/2012 | Swic | G09G 3/344 |
| | | | | 345/690 |
| 2015/0097879 | A1* | 4/2015 | Reeves | G09G 3/344 |
| | | | | 345/694 |
| 2016/0240148 | A1* | 8/2016 | Reeves | G02F 1/167 |

FOREIGN PATENT DOCUMENTS

| GB | 2504260 A | 1/2014 |
| WO | WO 99/65248 | 12/1999 |
| WO | WO 01/47045 | 6/2001 |
| WO | WO 2013/175214 | 11/2013 |

OTHER PUBLICATIONS

International Search Report for Application No. PCT/GB2014/053213 completed Dec. 18, 2014 in 4 pages.
Written Opinion for Application No. PCT/GB2014/053213 completed Dec. 18, 2014 in 9 pages.

* cited by examiner

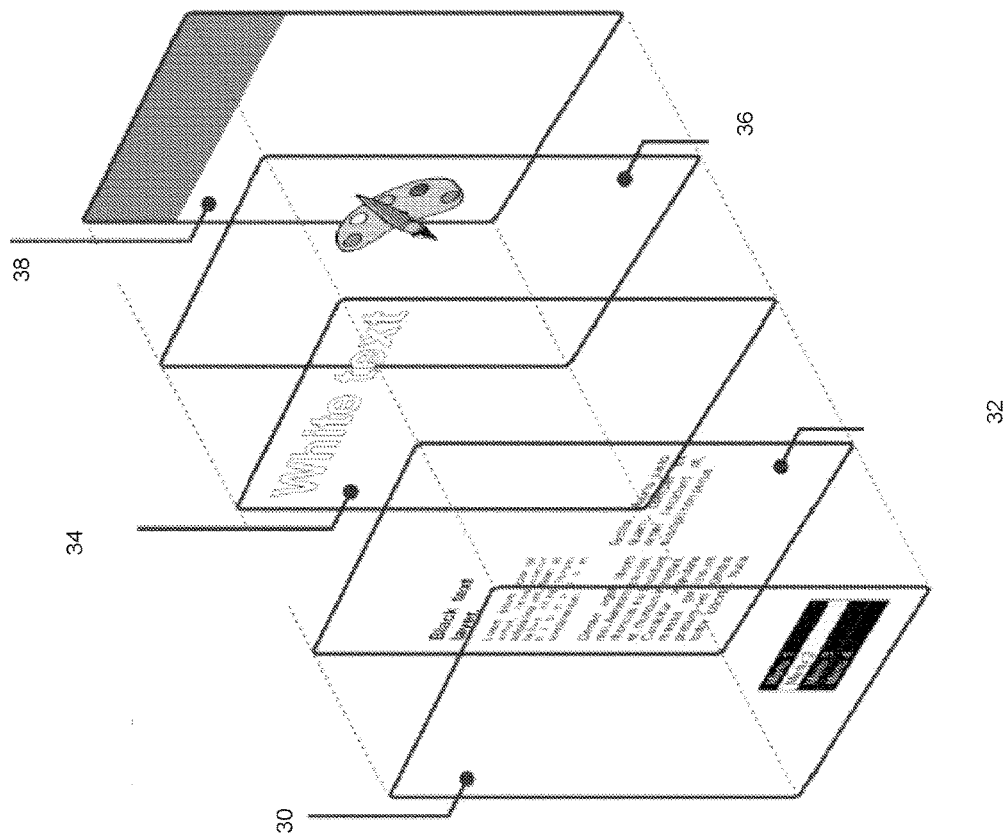
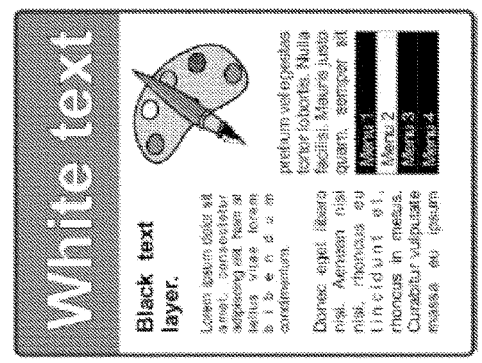
Figure 5a

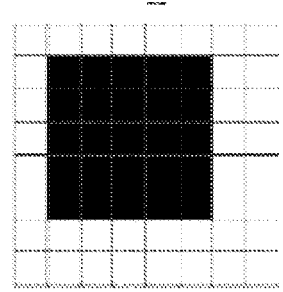 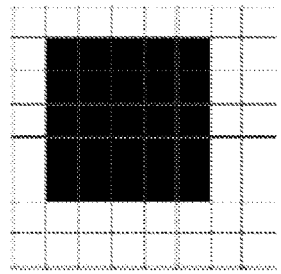 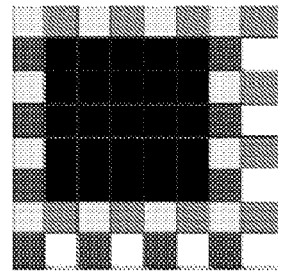
Figure 9a    Figure 9b    Figure 9c
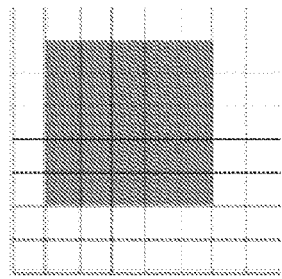 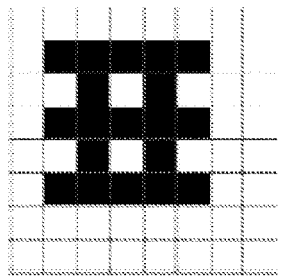 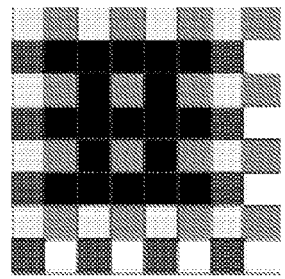
Figure 10a    Figure 10b    Figure 10c
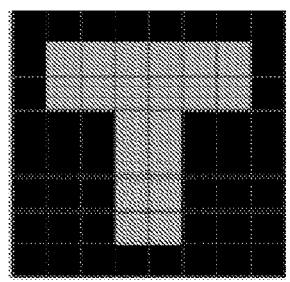 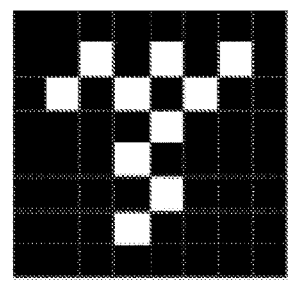 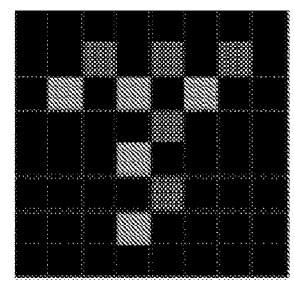
Figure 11a    Figure 11b    Figure 11c

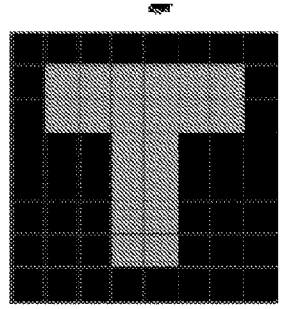 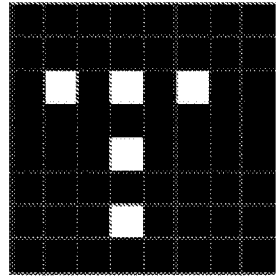 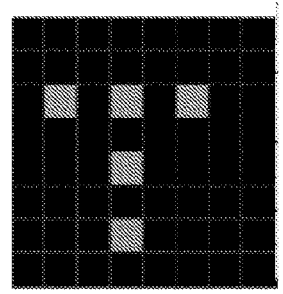
Figure 12a  Figure 12b  Figure 12c
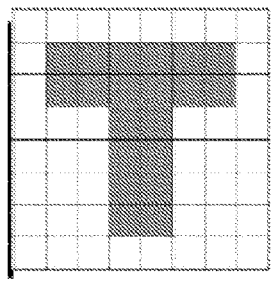 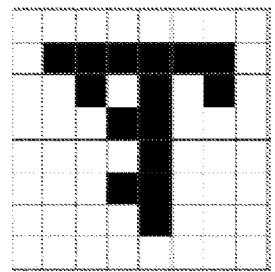 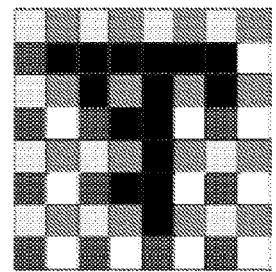
Figure 13a  Figure 13b  Figure 13c
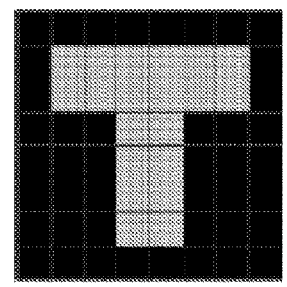 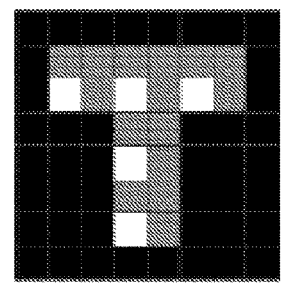 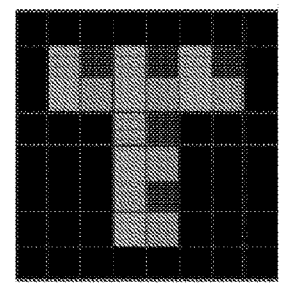
Figure 14a  Figure 14b  Figure 14c
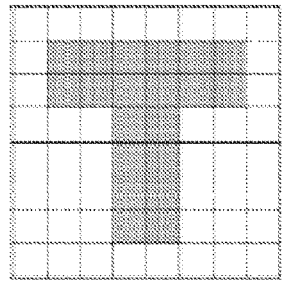 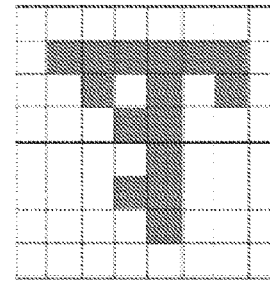 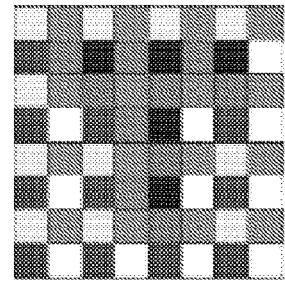
Figure 15a  Figure 15b  Figure 15c

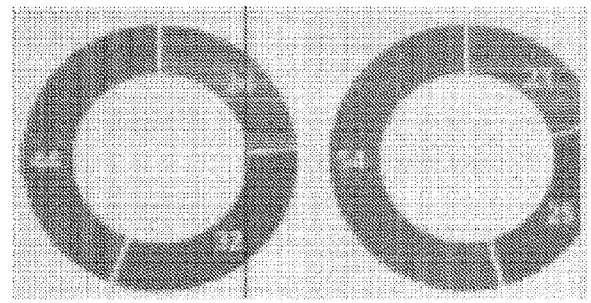
Figure 16a
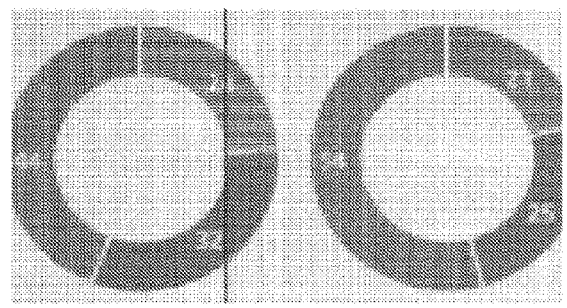
Figure 16b
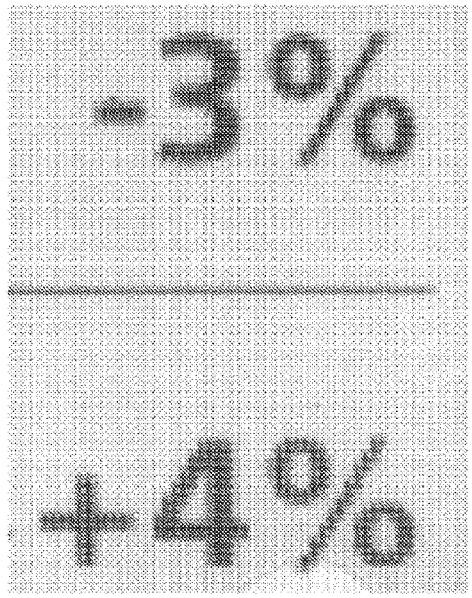 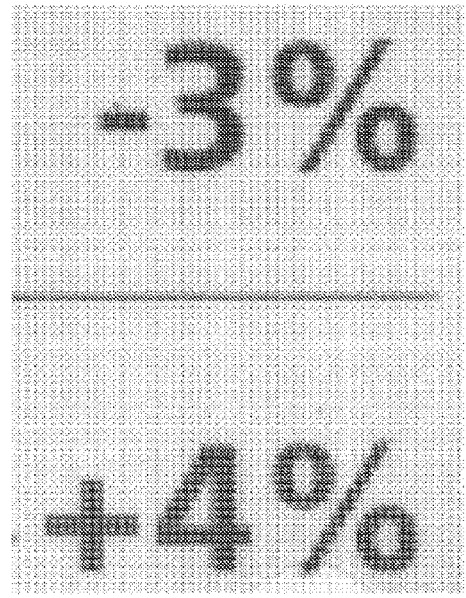
Figure 16c Figure 16d

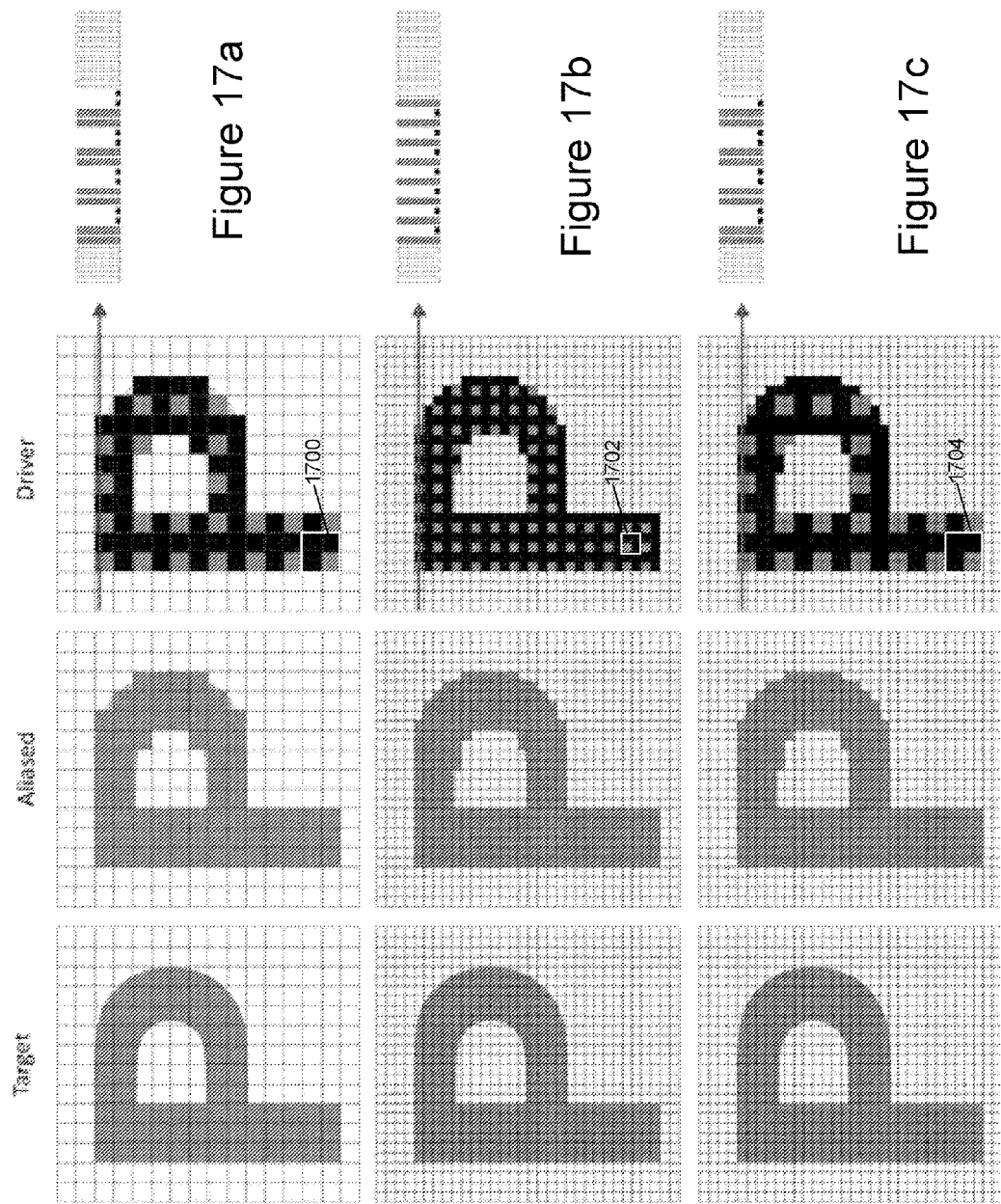

DISPLAY SYSTEMS AND METHODS

CROSS-REFERENCE TO RELATED APPLICATIONS

This application is the U.S. National Phase under 35 U.S.C. § 371 of International Application No. PCT/GB2014/053213, filed Oct. 29, 2014, designating the United States and published in English on May 7, 2015 as WO 2015/063477 and claiming priority to United Kingdom Patent Appl. No. 1319124.2 filed on Oct. 30, 2013.

FIELD OF THE INVENTION

This invention relates to systems and methods for displaying information on coloured electronic paper displays such as electrophoretic or electrowetting displays.

BACKGROUND TO THE INVENTION

In this specification we are particularly concerned with electronic paper displays, that is displays such as electrophoretic and electrowetting displays in which an electric field controls the appearance of a pixel, for example whether the pixel is black or white. Such displays are typically reflective, and thus easily visible in bright ambient light conditions and have a paper-like appearance as well as low power consumption. In electrophoretic displays typically small particles are dispersed in oil and the position and/or orientation of the particles is controlled by the applied voltage/electric field; in electrowetting displays the applied voltage/electric field typically controls the shape of a confined water/oil interface. Thus such electronic paper type displays may be characterised by use of a voltage/electric field to mechanically move some form of pigment or colouration which may be solid and/or liquid.

Current electronic paper displays provide some special problems compared with other technologies—they typically have a relatively low contrast ratio and a relatively limited number of different colours which can be displayed. We have previously described, in UK patent application GB1209301.9 filed on 23 May 2012 entitled "Electronic Display" (and in PCT/GB2013/051346) some techniques which may be employed to improve the apparent resolution of colour content presented on electronic paper displays. However other problems remain. In particular when, say, a chequer board of individual pixels is driven to an electronic paper display the result is not simply black and which and there is a region between pixels in some intermediate state between black and white. The width of this region is governed by the display design but tends to remain approximately constant regardless of display resolution. It arises from "fringing fields" and other electrically related phenomena. The result is that the smaller the pixels become, the less of the display is pure black and pure white.

In a typical colour electronic paper display the pixels are provided with coloured filter elements in a repeating pattern across the display so that individual pixels of the display show different colours. In order to achieve good colour performance it is important that as much as possible of the area of a pixel is at the intended grey level. However when representing a pure colour (ie the colour of one of the filter elements) adjacent pixels on the display to that of the pure colour are of opposite polarity to the activated pixels. For example if, say, displaying red on an electrophoretic display each "on" (white or reflective) red display pixel is surrounded by other display pixels that are "off" (black or non-reflective). If the display pixels are very small then none of the red pixels will ever reach full brightness and thus the colour will appear dim/unsaturated.

Thus it can be appreciated that for good colour reproduction larger display pixels are better, but in general the trend is towards ever higher pixel counts, increased resolution, and smaller pixels. We will describe techniques which address these difficulties.

SUMMARY OF THE INVENTION

According to a first aspect of the invention there is therefore provided a method of displaying colour data on an electronic paper display, the method comprising: providing an electronic paper display having display pixels at a display pixel pitch; providing a colour filter for said display, said colour filter comprising groups of coloured filter elements, each said coloured filter element having one of a plurality of different colours, wherein each group of coloured filter elements defines a pattern of said coloured filter elements, and wherein in said pattern a coloured filter element overlies an integral number, n, of said display pixels, where n is two or more; providing colour image data defining a plurality of colour image planes, one for each of said different colours, wherein data in a said colour image plane comprises image pixel data defining values for image pixels corresponding to said display pixels; selecting, from said data in each said colour image plane, data for image pixels corresponding to display pixels over which the filter elements of the respective colour for the colour plane lie; and using said selected data to drive said electronic paper display; wherein on said display a rate of spatial variation of said selected data for said image pixels is less than said display pixel pitch.

Broadly speaking in embodiments of the method the colour sub-pixel elements of the colour filter are larger than the display pixels of the underlying electronic paper display so that the "sub-pixel modulation is at a lower (spatial) frequency than would otherwise be the case with an approach in which the filter colour changed with each successive, adjacent display pixel. For example, in embodiments the resolution of the colour filter (as defined by the colour sub-pixels of the filter) is an integral fraction of the resolution of the display along a row and/or column (where the integer is 2 or greater). For example a high resolution display may be overlaid with a half resolution colour filter—and if, say, there are four colours this may mean that colour is effectively overlaid on the display at a quarter resolution. Counter-intuitively the overall visual appearance of such a display is nonetheless improved because the spatial frequency at which colour information is written to the display is reduced, resulting in brighter, more saturated colours.

In embodiments in any particular direction (arbitrarily, row or column) of the display data for a subset, c, of the different colour planes may be presented. Then the rate of spatial variation of one of these colours along the row/column is 1/(n×c) of a rate of spatial variation defined by the pitch of the display pixels along the row/column. For a pure colour the spatial frequency at which signals on the pixel drive lines along the row/column of the display is reduced by a corresponding fraction, reducing the effects of the fringing fields. In some colour filter layouts, for example with a square pattern of coloured filter elements, only a subset of the different colour planes will appear along a particular row/column, but in other colour filter layouts all the different colour filter elements, and hence all the colour planes, may appear along a particular row/column of the display (although this latter approach is less preferable for current, limited colour displays). In a square arrangement of colour filter elements where four different colours and four different colour planes are employed, two different colours/colour planes may be combined along each row of the display and the spatial frequency of any one colour along the row/column is then one quarter of that defined by the display pixel pitch.

It will be appreciated that references to different colours include white (no coloured filter)—for example a group of four different coloured filter elements may comprise red, green, blue and white (no filtering) colour elements. This is helpful, for example, for displaying black/white text along with coloured image content.

The skilled person will appreciate that the colour image data defining the plurality of colour image planes need not be organised in memory as separate planes as long as data for each "pixel colour" can be identified. In addition it will be appreciated that colour data for display may be provided using any convenient representation of colour information, although it will also be appreciated that at some point in the procedure this will be converted to data identifying an on/off/grey level state for the pixels of each separate colour (ie display pixels covered by respective coloured filter elements).

Advantageously data for writing to the display pixels provided with different coloured filter elements is selected from the data in each colour plane, in embodiments by applying a colour filter sub-pixel mask to the relevant colour image plane. Such a sub-pixel mask may be zero everywhere except where pixels of the relevant colour are located; the mask may be defined in hardware, software or a combination of the two. Thus in embodiments the selecting and combining of data for display on a row (or column) of the display uses:

$$Out(i,j)=Rm(i,j)*I(i,j,R)+Gm(i,j)*I(i,j,G)+Bm(i,j)*I(i,j,B)+Wm(i,j)*I(i,j,W)$$

where i,j define row and column display pixel coordinates, $I(i,j,R)$, $I(i,j,G)$, $I(i,j,B)$, $I(i,j,W)$ are red, green, blue and white colour image plane data, and $Rm(i,j)$, $Gm(i,j)$, $Bm(i,j)$, $Wm(i,j)$ are respectively red, green, blue and white colour masks representing coordinates of respective red, green, blue and white said coloured filter elements, and $Out(i, j)$ defines the data for display on a row and/or column.

Embodiments of the method include receiving electronic document data for presentation on the display and rendering the content of this electronic document data for display at a spatial resolution of the display pixels. More particularly this is advantageously performed by converting the electronic document data to colour image data where each colour plane of the colour image data defines data at a spatial resolution of the display pixels. That is, even though the resolution of the colour filter is lower than that of the display per se, preferably the electronic document data is rendered to the native resolution of the display without its colour filter and then afterwards colour image data selected, for example by applying a colour filter sub-pixel mask as previously described. As demonstrated later, this provides an overall improved appearance for the rendered content. (Here rendering to the spatial resolution of the native display refers to rendering to the number of native, unfiltered pixels used on the display when presenting content).

In a related aspect the invention provides an electronic paper display having display pixels at a display pixel pitch, further comprising a colour filter for said display, said colour filter comprising groups of coloured filter elements, each said coloured filter element having one of a plurality of different colours, wherein each group of coloured filter elements defines a pattern of said coloured filter elements, and wherein in said pattern a coloured filter element overlies an integral number, n, of said display pixels, where n is two or more.

In some preferred embodiments the pattern on the colour filter comprises a pattern of 16 native display pixels comprising four squares each of four display pixels, each square defining a different coloured filter element region of the filter.

In a further related aspect the invention provides a controller for an electronic paper display, the controller comprising: an input to receive colour image data defining a plurality of colour image planes, one for each of said different colours, wherein data in a said colour image plane comprises image pixel data defining values for image pixels corresponding to said display pixels; a system to select, from said data in each said colour image plane, data for image pixels corresponding to display pixels over which the filter elements of the respective colour for the colour plane lie; and an output to combine said selected data into row/column data for driving pixels of said electronic paper display; wherein on said display, when driven, a rate of spatial variation of said selected data for said image pixels is less than said display pixel pitch.

The controller may be implemented in hardware, in an electronic circuit, or in software, for example as processor control code in (non-volatile) programmed memory, or a combination of the two. In general the controller will provide display data to one or more waveform generators (which may be, for example, off the shelf integrated circuits and/or ASICs), which generate appropriate control waveforms for driving the display to represent the on/off/grey pixel levels defined by the data In some preferred embodiments the electronic paper display is an electrophoretic display, but the techniques we describe may also be employed with other types of electric-field controlled display including, but not limited to, an electrowetting display (which includes an electrofluidic display), an electrokinetic display, and an electrochromic display.

In embodiments the techniques we describe are applied to a flexible display having a backplane comprising an active matrix of organic field effect transistors, in which pixels of the display are driven by drain or source connections of the transistors referenced to a backplane common electrode and to a common pixel electrode (top electrode). The techniques we describe are not limited to use with a flexible display with a backplane comprising organic thin film transistors, but can be of particular advantage in such display arrangements.

In a still further related aspect the invention provides an electric field controlled display such as an electrophoretic or electrowetting display having a colour filter, wherein colour sub-pixels of said filter are larger than native pixels of said display.

Here the sub-pixels are the differently coloured sub-pixels of the colour filter, as distinguished from the native pixels of the display. Thus a pixel of the colour filter comprises a set of differently coloured colour filter sub-pixels, each of which filters a plurality of native display pixels. Thus preferably these colour filter sub-pixels have one dimension or two orthogonal dimensions which is/are an integral multiple (equal to or greater than two) of a size of the native display pixels.

BRIEF DESCRIPTION OF THE DRAWINGS

These and other aspects of the invention will now be further described by way of example only, with reference to the accompanying figures in which:

FIG. 5a is a schematic illustration of a typical colour electronic document to be displayed;

FIGS. 9a, 10a, 11a, 12a, 13a, 14a and 15a illustrate various target images on various backgrounds;

FIGS. 9b, 10b, 11b, 12b, 13b, 14b and 15b illustrate the output to the driver to generate the target images;

FIGS. 9c, 10c, 11c, 12c, 13c, 14c and 15c illustrate the real results of the outputs from FIGS. 9b, 10b, 11b, 12b, 13b, 14b and 15b;

FIGS. 16a and 16c show two sample images encoded using the method of FIGS. 7a to 7c;

FIGS. 16b and 16d show the two sample images of FIGS. 16a and 16c encoded using the method of FIGS. 8a to 8c;

FIGS. 17a to 17c show, respectively, a combination of a half resolution electrophotetic display with a half resolution colour filter; a combination of a full resolution electrophotetic display with a full resolution colour filter; and a combination of a full resolution electrophotetic display with a half resolution colour filter according to an embodiment of the invention; and a schematic illustrations of corresponding backplane waveforms.

DETAILED DESCRIPTION OF THE DRAWINGS

Figure 1A:
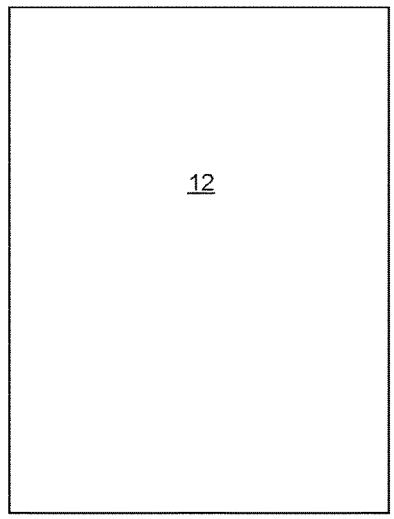
FIGS. 1a and 1b show respectively, a front view and a rear view of an electronic document reader.
Figure 1B:
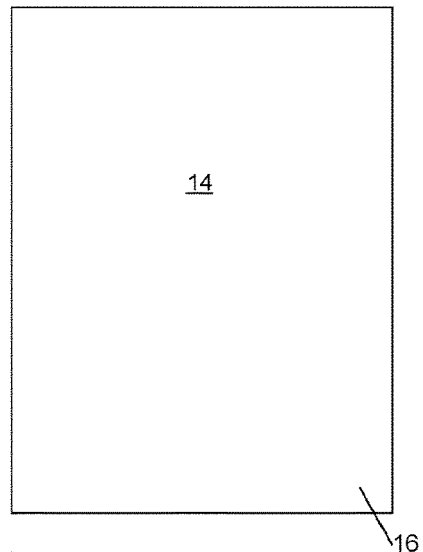

We first describe some technical details of electronic document reading devices, and how colour information may be represented on such displays, as this is helpful for understanding the operation of embodiments of the invention Electronic Document Reading Devices FIGS. 1a and 1b schematically illustrate an electronic document reading device 10 having a front display face 12 and a rear face 14. The display surface 12 is substantially flat to the edges of the device and may as illustrated lack a display bezel. However, it will be appreciated that the electronic (electrophoretic) display may not extend right to the edges of the display surface 12, and rigid control electronics may be incorporated around the edges of the electronic display.

Figure 2A:
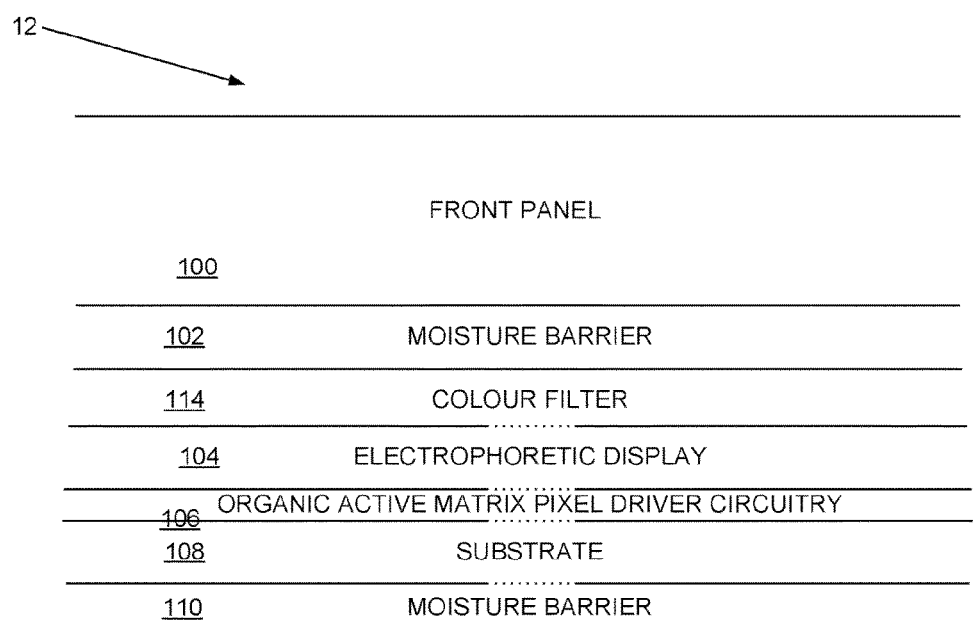
FIG. 2a shows a detailed vertical cross-section through a display portion of the reader of FIG. 1.

Referring now to FIG. 2a, this illustrates a vertical cross-section through a display region of the device. The drawing is not to scale. The structure comprises a substrate 108, typically of plastic such as PET (polyethylene terephthalate) on which is fabricated a thin layer 106 of organic active matrix pixel driver circuitry. The active matrix pixel driver circuitry layer 106 may comprise an array of organic or inorganic thin film transistors as disclosed, for example, in WO01/47045. Attached over this, for example by adhesive, is an electrophoretic display 104. The electrophoretic display is a display which is designed to mimic the appearance of ordinary ink on paper and may be termed electronic paper, e-paper and electronic ink. Such displays reflect light and typically the image displayed is greyscale (or monochrome). It will be appreciated that other displays may be used in place of the electrophoretic display.

A moisture barrier 102 is provided over the electronic display 104, for example of polyethylene and/or Aclar™, a fluoropolymer (polychlorotrifluoroethylene-PCTFE). A moisture barrier 110 is also preferably provided under substrate 108. Since this moisture barrier does not need to be transparent preferably moisture barrier 110 incorporates a metallic moisture barrier such as a layer of aluminium foil. This allows the moisture barrier to be thinner, hence enhancing overall flexibility. In preferred embodiments the device has a substantially transparent front panel 100, for example made of Perspex®, which acts as a structural member. A front panel is not necessary and sufficient physical stiffness could be provided, for example, by the substrate 108 optionally in combination with one or both of the moisture barriers 102, 110.

A colour filter 114 is optionally applied over the display. Such a filter is a mosaic of small filters placed over the pixel sensors to capture colour information and is explained in more detail below. The filter may be a RGBW (Red, Green, Blue, White) filter or another equivalent version.

Figure 2B:
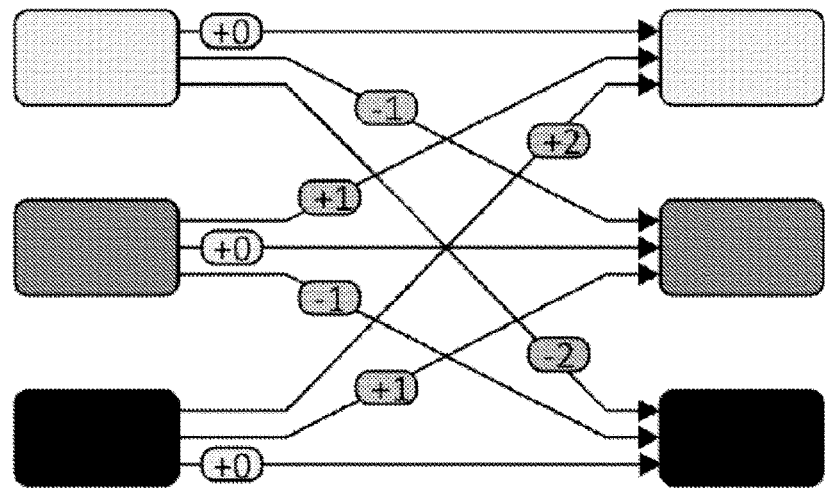
FIG. 2b shows an example of a waveform for an electrophoretic display of the reader of FIG. 1.

Reflective displays, e.g. electrophoretic display media, are unlike most display technologies. When power is removed from conventional displays (such as LCD, OLED and Plasma) they revert to an off-state. This state is known and any colour can be driven accurately from this starting point. Reflective displays differ since they retain the last image that was written to them. Therefore, the display must be unwritten before it is rewritten. Waveforms are set of "transitions" that tell a pixel how to change from one image to the next; essentially a guide on how to turn every grey level to every other grey level. For a display capable of three grey levels this results in a waveform with nine transitions as shown schematically in FIG. 2b.

Figure 3B:
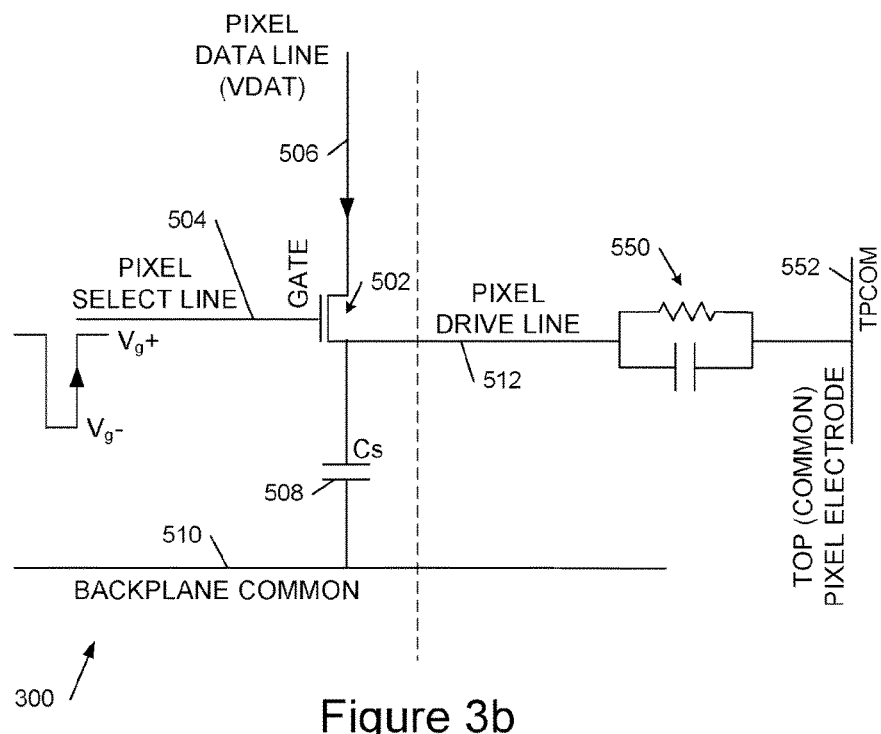
FIGS. 3a and 3b show, respectively, a block diagram of control circuitry suitable for the electronic document reader of FIG. 1a, and an example of a pixel driver circuit on a flexible plastic backplane, in combination with a pixel of an electrophoretic display.
Figure 3A:
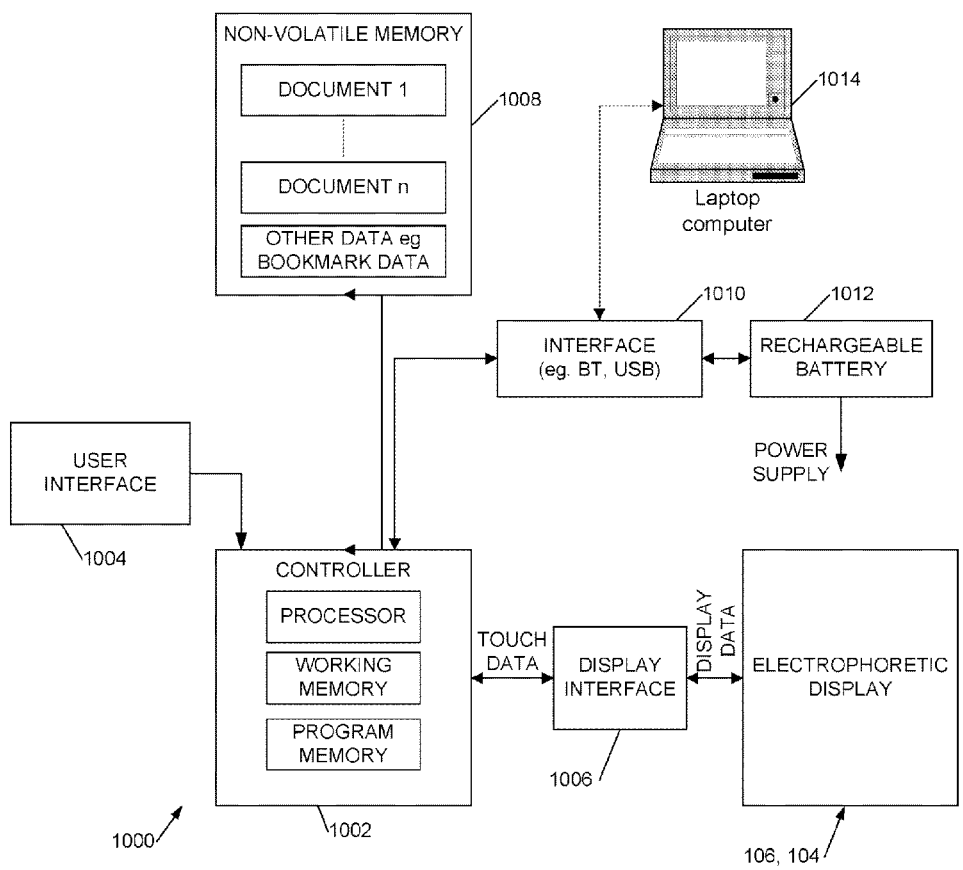

Referring now to FIG. 3a, this shows example control circuitry 1000 suitable for the above-described electronic document reader 10. The control circuitry comprises a controller 1002 including a processor, working memory and programme memory, coupled to a user interface 1004 for example for controls 130. The controller is also coupled to the active matrix driver circuitry 106 and electrophoretic display 104 by a display interface 1006 for example provided by integrated circuits 120. In this way controller 1002 is able to send electronic document data to the display 104 and, optionally, to receive touch-sense data from the display. The control electronics also includes non-volatile memory 1008, for example Flash memory for storing data for one or more documents for display and, optionally, other data such as user bookmark locations and the like. The skilled person will appreciate that processor control code for a wide range of functions may be stored in the programme memory.

Special Problems of Flexible Electrophoteric Displays

Referring now to FIG. 3*b*, this shows an example of a pixel driver circuit 300 fabricated using solution deposition techniques on a flexible plastic backplane, in combination with a pixel 550 of an electrophoretic display. In FIG. 3*b* the portion to the right hand of the dashed line constitutes the electrophoretic display and the portion to the left side of the dashed line, the active matrix backplane; these are sandwiched together to make an active matrix display.

The pixel driver circuit of FIG. 3*b* comprises a thin film transistor 502 having a gate connection 504 which is connected to a pixel select line of the display. When activated a voltage on pixel data (VDAT) line 506 is coupled to one plate of storage capacitor Cs 508, the other plate of which is connected to a backplane common connection 510. The junction between transistor 502 and storage capacitor 508 also provides a pixel drive line 512 which is connected to the electrophoretic display pixel 550. Pixel 550 may be modelled as a high value resistor, for example of order 800 MΩ, in parallel with a small capacitor, for example less than 1 pF. A second connection of the electrophoretic display pixel is connected to the common or top pixel electrode, TPCOM 552.

In operation, when the pixel select line 504 is activated the voltage on line 506 is applied between the pixel drive line 512 and TPCOM 552, and is also stored on capacitor 508; an example gate drive waveform is shown. A single pixel may be written to perhaps every 20-30 ms, to maintain a drive to the pixel. When driving an electrophoretic display pixel, the relatively slow response introduces difficulties: to speed the display update often only a small region of the display is updated since often, when for example typing, only a small region of the display changes. The remainder of the display is written with a null frame, that is with a voltage on line 506 of zero volts, which for an electrophoretic display corresponds to no-change in the displayed "colour". However, because of this there can be a gradual drift towards either a black or white level (under the colour filter), which can be very visible over an extended region of the display. Moreover the large stray capacitances associated with plastic electronics and flexible plastic substrates, and the ability to mechanically deform (flex) the display, make it more difficult to achieve, and maintain, a particular pixel drive level across the area of a pixel. It can therefore be appreciated that there can be particular difficulties with the representation of coloured regions of an electrophoretic displays with a plastic backplane.

Continuing now to refer to FIG. 3*a*, an external interface 1010 is provided for interfacing with a computer such as laptop, PDA, or mobile or 'smart' phone 1014 to receive document data and, optionally, to provide data such as user bookmark data. The interface 1010 may comprise a wired, for example USB, and/or wireless, for example Bluetooth™ interface and, optionally, an inductive connection to receive power. The latter feature enables embodiments of the device to entirely dispense with physical electrical connections and hence facilitates inter alia a simpler physical construction and improved device aesthetics as well as greater resistance to moisture. A rechargeable battery 1012 or other rechargeable power source is connected to interface 1010 for recharging, and provides a power supply to the control electronics and display.

Electronic documents to be displayed on the reader may come from a variety of sources, for example a laptop or desktop computer, a PDA (Personal Digital Assistant), a mobile phone (e.g. Smart Phones such as the Blackberry™), or other such devices. Using the wired (e.g. USB etc) or wireless (e.g. Bluetooth™) interfaces, the user can transfer such electronic documents to the document reader in a variety of ways, e.g. using synchronisation or "printing". Electronic documents may comprise any number of formats including, but not limited to, PDF, Microsoft Word™, Bitmaps, JPG, TIFF and other known formats.

For transfer using synchronisation, the user connects the electronic document reader to a separate device (e.g. laptop or desktop computer, PDA or 'smart' phone) which is storing an electronic document. During this synchronisation, all of the electronic documents that are stored in any number of user-defined folders defined on the separate device, and that are not present in the memory of the reader are transferred to the reader. Similarly, any documents not present on the separate device that are present on the reader (for example, documents that have been modified or written to whilst displayed on the reader) may also be transferred back to the separate device. Alternatively, the connection interface may allow a user to specify that only a subset of the documents are to be synchronised. Alternatively, a live synchronisation may be performed, where the reader could store all documents that have been recently viewed on the separate device.

During synchronisation, the separate device takes control of the reader and transfers data to and from the reader. To understand the capabilities of the reader, the separate device may require several software components to be installed, for example, a printer driver; a reader driver (to manage the details of the communications protocol with the reader) and a controlling management application.

The incorporation of a printer driver or similar intermediary module to convert the electronic document into a suitable format for displaying on the reader allows transfer of the documents by "printing". The intermediary module generates an image file of each page within a document being printed. These images may be compressed and stored in a native device format used by the electronic reader. These files are then transferred to the electronic reader device as part of a file synchronisation process.

One of the advantages of this "printing" technique is that it allows support for any document/file for which the operating system has a suitable intermediary module, such as a printer driver module, installed. During the file synchronisation sequence the control program looks at each document and determine whether the operating system associates an application with that file, for example, a spreadsheet application will be associated with a spreadsheet document. The control application invokes the associated application and asks it to 'print' the document to the printer module. The result will be a series of images in a format suitable for the electronic reader; each image corresponding to a page of the original document. These images will appear on the electronic reader, as if the document had been printed. The electronic reader may thus be termed a "paperless printer".

Figure 4:
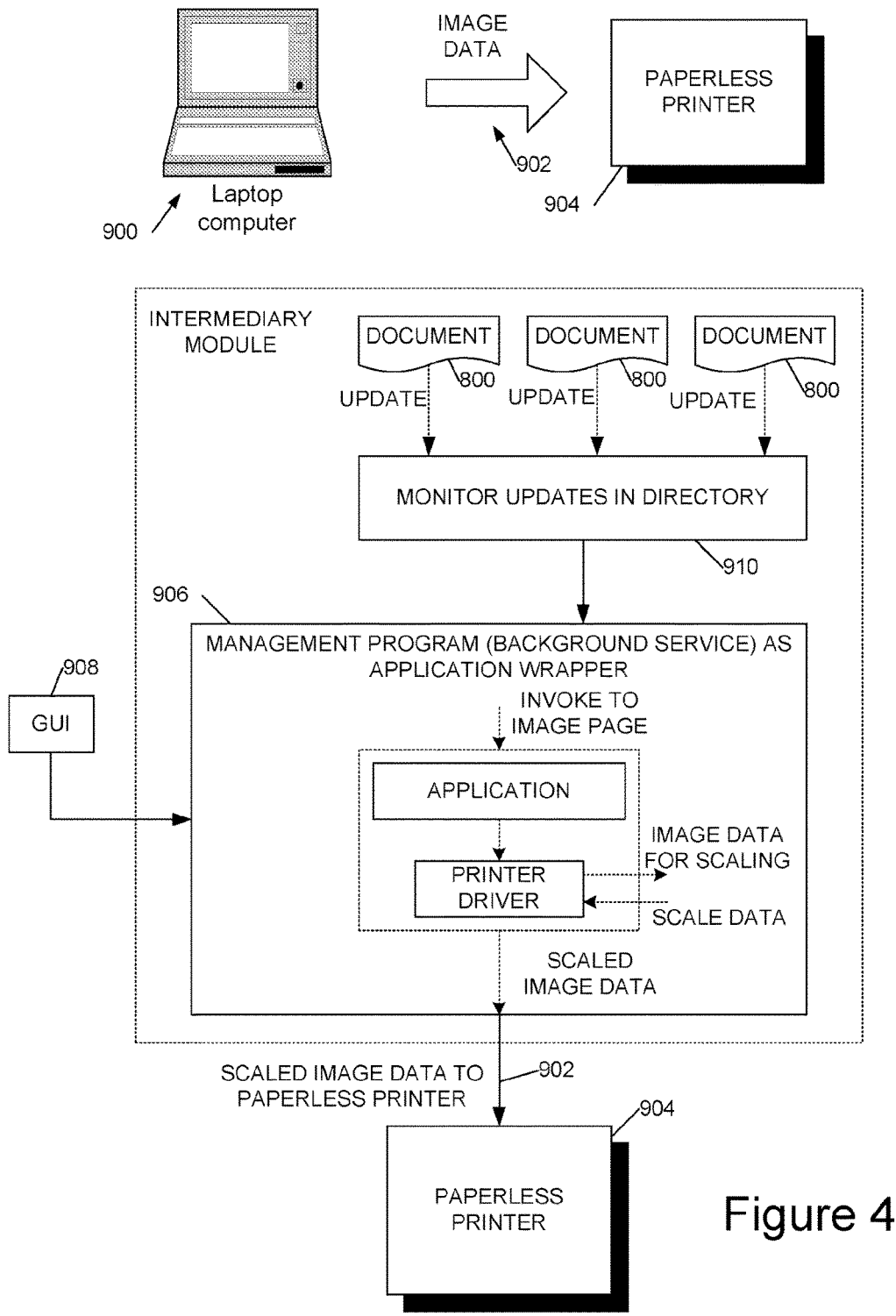
FIG. 4 is a block diagram of an intermediary module for an electronic consumer device connected to the reader.

FIG. 4 schematically illustrates the components for "printing" implemented on a computerised electronic device such as a laptop computer 900, although it will be understood that other types of device may also be employed. Page image data 902 at a resolution substantially equal to that of a resolution of the electronic reader is sent to the electronic reader 904 for display. Optionally information such as annotation data representing user annotations on a paperless printer document may be transferred back from electronic reader 904 to consumer electronic device at 900, for example as part of a synchronisation procedure.

An intermediary module comprising a management program 906 preferably runs as a background service, i.e. it is hidden from a general user. The intermediary module may reside in the document reader 904 or on the electronic device 900. The processing by the intermediary module may include adjusting or cropping margins, reformatting or repaginating text, converting picture elements within a document into a suitable displayable content, and other such processes as described below.

A graphical user interface 908 is provided, for example on a desktop of device 900, to allow a user to setup parameters of the paperless printing mechanism. A drag-and-drop interface may also be provided for a user so that when a user drags and drops a document onto an appropriate icon the management program provides a (transparent) paperless print function for the user. A monitoring system 910 may also be provided to monitor one or more directories for changes in documents 800 and on detection of a change informs the management program 906 which provides an updated document image. In this way the management program automatically "prints" documents (or at least a changed part of a document) to the electronic reader when a document changes. The image information is stored on the electronic reader although it need not be displayed immediately.

Colour Rendering

FIG. 5a illustrates a typical electronic document to be displayed (e.g. printed) on the electronic reader. The document comprises different types of content, often described as objects, which are illustrated as separate layers for ease of understanding. The document comprises user interface elements 30 allowing a user to interact with the document, e.g. to select different menus. There are two different types of text content, black text 32 and white or other coloured text 34. There are also images 36, pixelated graphics with each pixel defining a specific colour (termed bitmaps) and mathematically defined shapes that are assigned with specific colours and thus form areas of block colour 38 (also termed vector graphics).

Figure 5B:
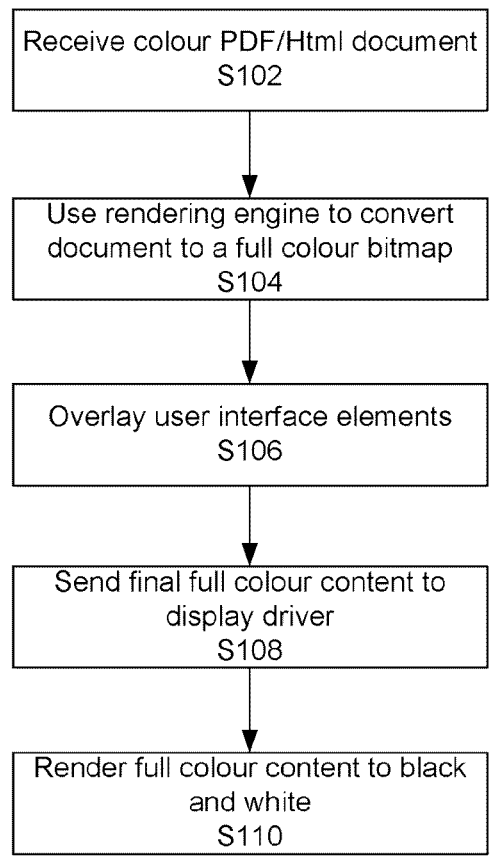
FIG. 5b is a flow chart illustrating one known method of processing the document of FIG. 5a to be displayed on the reader.

FIG. 5b illustrates how a colour electronic document is typically processed for display in black and white. At a first step S102, the electronic document is received in PDF, HTML or similar format. Such a format contains the text, image and vector graphics content. The document is converted in a rendering engine to a full colour bitmap (step S104). In a next step, the user interface elements are overlaid on the full colour bitmap (step S106) to create a final image which is in full colour. Other form elements and other scriptable pre-rendered content may also be added at this stage. This final full colour image is then sent to the display driver (step S108) which renders the image to black and white and optimises it for the display (step S110). The problem with this method is that there is typically little control over how the content is rendered to the display.

Figure 5C:
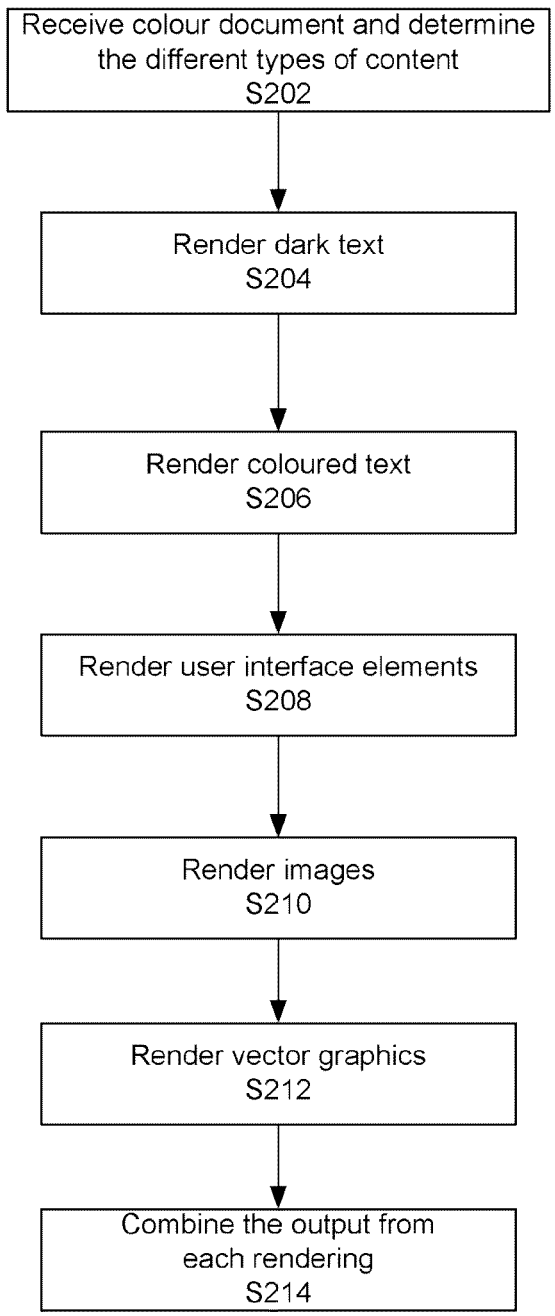
FIG. 5c is a flow chart illustrating a method of processing the document of FIG. 5a to be displayed on the reader.

As explained in the background section, the process of printing coloured documents using a black and white printer often results in the loss of important information. FIG. 5c illustrates how an electronic document may be processed to improve its display on the electronic reader. The processing may be carried out by the intermediary module described above. Essentially all different types of content are rendered optimally in isolation and are then layered back together.

The order in which each layer is rendered is not critical and the steps S204 to S212 of FIG. 5c can be carried out in any order. By rendering, it is meant, converting the document (or layer of the document) from its native format or code into an image suitable for output. Rendering may comprise first defining a bitmap and using that bitmap (and the unrendered image/bitmap) to determine the output. The output may be a waveform or set of waveforms which is provided to the display driver (i.e. to the active matrix driver circuitry). The waveform is a set of rules controlling the individual pixels within the matrix. For example, considering a simple case of changing between black and white, the set of rules comprises black to black, white to white, white to black and black to white. For a grayscale display having a variety of shades of grey, the set of rules is more numerous.

Figure 5D:
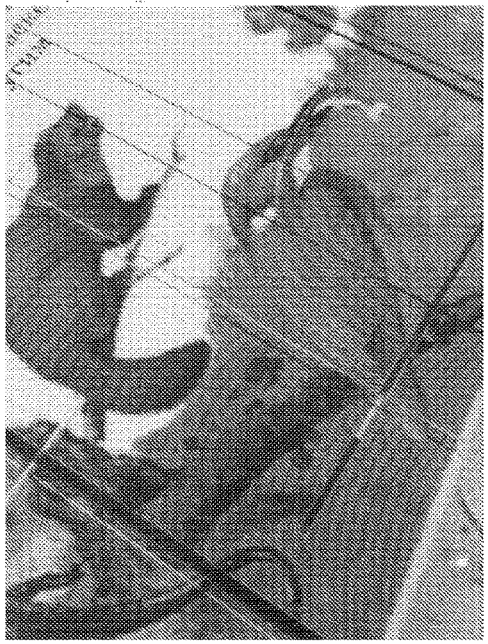
FIGS. 5d to 5g compare the results of sharpening on an image and text, respectively.
Figure 5E:
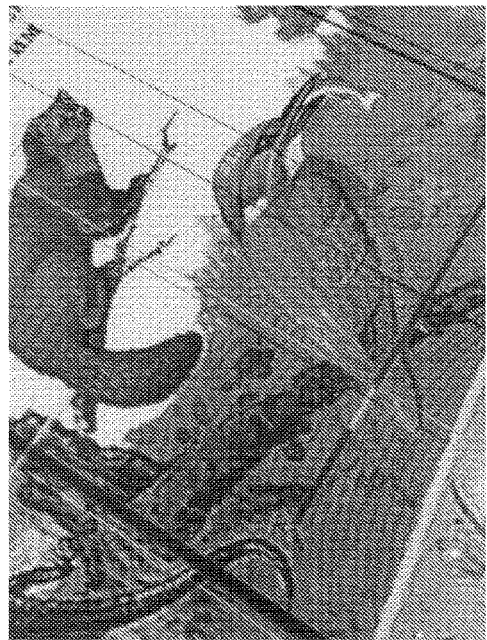
Figure 5F:
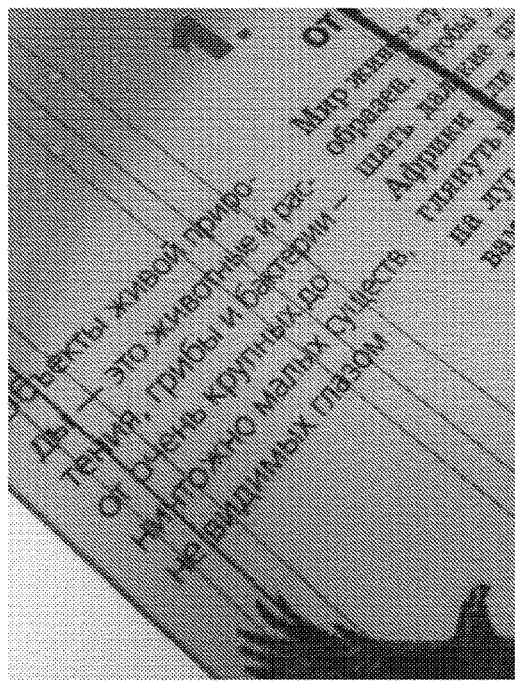
Figure 5G:
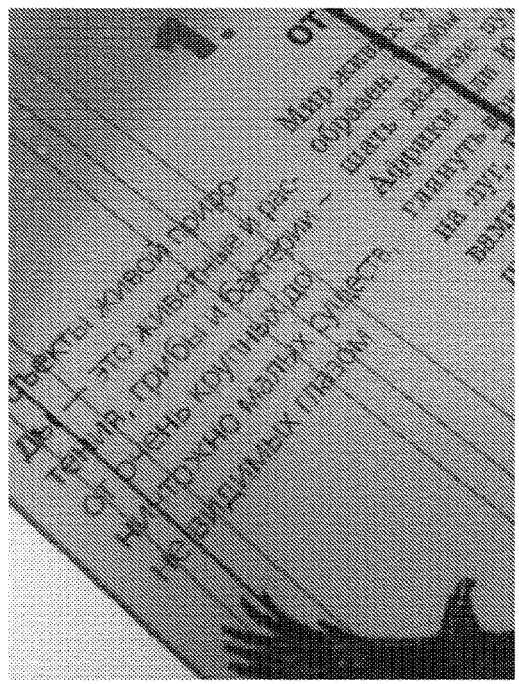

The first step is to receive the colour document and determine the different types of content S202. The dark text content may be rendered separately at step S206. Dark text may include dark grey, black or dark blue text. Accordingly, the first step of the rendering may include optimising the text colour, e.g. forcing all text of this type to black text. Where a colour filter is included, the text may be rendered at 150 ppi (pixels per inch) on a 75 ppi filter to improve resolution. The black text layer may be output as a fast waveform to make the text appear faster which may mean that it appears before other elements of the document. For example, FIGS. 5f and 5g show the results of applying standard sharpening techniques to the text which result in "spindly" text. A solution to this may include avoiding standard sharpening techniques for the black text. Alternatively/additionally, the waveform may also be optimised to make the text look less "spindly", e.g. to thicken the outlines.

The white or other light coloured text content is rendered separately at step S204. As set out above, e-paper has only 16 colours whereas a full colour palette may have millions of colours. The intermediary module may store a look-up table which links the grayscale colours of the display to a predetermined number of colours from a full colour palette. The predetermined number of colours may be termed "native" colours. The rendering of the light colour text may include determining the colour of the text, determining which of the native colours is the closest match and setting the colour of the light colour text to this closest match colour. The light coloured text is preferably rendered separately from its background to avoid any dithering with the background.

The user interface elements are identified and rendered at step S206. The rendering may include determining the different types of user interface elements, e.g. text and highlights, and rendering each different type of user interface element separately. For example, the highlights (e.g. to show a user selection) may be rendered by determining the colour of the highlight and determining the best representation from the look-up table as described in relation to the coloured text above. The text may be rendered separately as described above and then overlaid. Additional image enhancement should not be required because the content has already been optimised by use of the other techniques. However, image enhancements, e.g. as described below, could also be used.

The rendering may also include using a novel waveform to create the illusion of animation by exploiting the fact that electrophoretic media is relatively slow compared to more conventional display technologies. The waveforms shown in FIG. 2b relate to ways of directly changing from one image to another. We define "Transition Waveforms" to be a waveform that combines not only grey-level to grey-level information, but some spatial rules about the order in which the pixels are updated. These waveforms make use of electrophoretic media's slow response for "animation like" display updates.

Possible Spatial Transition Waveforms Include:
Wipe: update one side of the display (or partial area) before the other and stagger the update in between.
Random dissolve
Chequer board: update alternating squares at different times
Random bars
Radial Customised "tags" either in XML or PDF or some other extensible mark-up language may be manually added to select the transition type. Alternatively, the transition type may be automatically selected based on content type.

Each image in the image layer may be rendered at step S208. The images may be processed separately or together. For example, standard techniques such as saturation boosting or sharpening may be applied independently to each image. For example, FIGS. 5d and 5e illustrate the improvement to an image using standard sharpening techniques. The overall waveform component for the image layer may be an accurate waveform to improve grey level spacing. The result of the more accurate waveform means that the images may appear on the screen later than some of the other elements, e.g. black text.

The blocks of colour are rendered separately at step S212. In a similar manner to the rendering of the light coloured text, the rendering of the colour blocks may include determining the colour of the text, determining which of the native colours is the closest match and setting the colour of the light colour text to this closest match colour. The coloured blocks are preferably rendered separately from any text or other foreground to avoid any dithering with the foreground.

A final step (S214) is to combine the output from each layer to provide the overall waveform output. In practice the waveforms are more complicated than depicted in FIG. 2b. Transitions, and therefore waveforms, can theoretically be of any length and can be optimised for different purposes, with trade-offs such as:

Speed—grey level placement accuracy is degraded and "residual image" or "ghosting" (where the previous image isn't perfectly un-written) becomes more of a problem Image quality—grey level placement is accurate with minimal "ghosting" but the waveform transitions are longer "The appearance of the update"—most applicable to colour displays. In the process of transitioning between colour images inverted colours can appear and look distracting to the eye. The waveform can be designed to minimise this and improve the visual appearance of the transition. However this may also affect the speed or image quality.

One waveform may be used per page, but as set out above the ability to drive different types of content with different waveforms could be advantageous. A simple example would be to drive text with a very fast waveform and "fill in" the images with a slower more accurate waveform.

Figure 6:
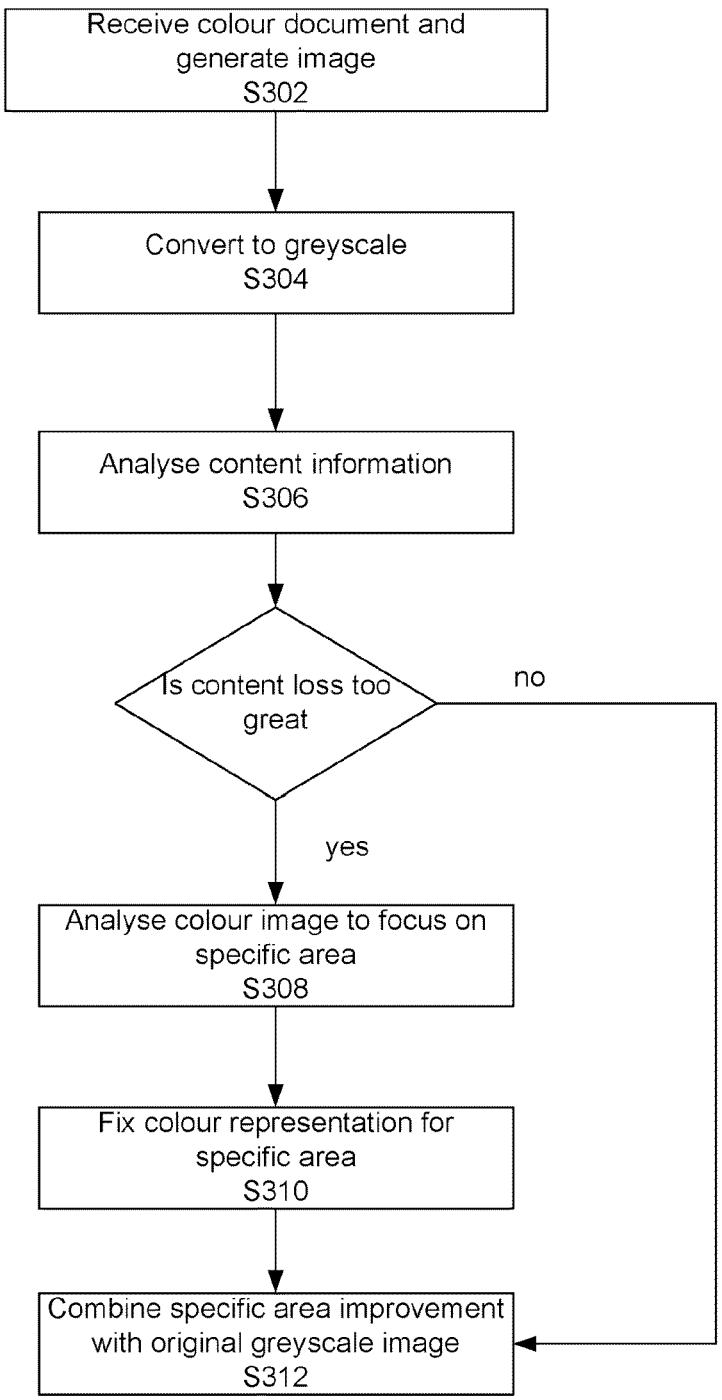
FIG. 6 is a flow chart illustrating a method of processing the document of FIG. 5a to be displayed on the reader.

FIG. 6 shows an alternative method for converting a colour document to a greyscale image for an electronic reader. At a first step (S302), the colour document is received and analysed to generate an image of the document. The image is then converted to greyscale at step S304. The next step is to compare the content contained in the original colour image with the content of the converted image using standard techniques. If it is determined that there is a loss of information above a threshold value, the process returns to the original colour image and selects a specific area. For example, in line with FIG. 5c, the process may divide the document into layers and select one particular layer, e.g. colour blocks, to enhance in isolation from the other areas (Step S308). Alternatively, another algorithm for selecting the area to be enhanced may be used.

Once the area has been selected, a separate improvement algorithm may be run (step S310). For example, a look-up table may be provided to differentiate the plurality of colours which may be used in the colour image. The look-up table may be used to force the colour in the colour image to fit a best match colour. Alternatively, the look-up table may combine colours and patterns to provide a greater list of representations to differentiate the colours. For example, light blue may be represented by hash lines in the look-up table.

A final step (S312) is to combine the improvement to the specific area with the representation for the rest of the image and to output the overall waveform output representing the greyscale image.

As shown in FIG. 2, an optional colour filter may be applied over the electrophoretic display to provide a colour image display on the electronic reader. In the following examples, a RGBW filter is used although it will be appreciated that other similar colour filters could be used.

One disadvantage of using such a colour filter is that it effectively halves the true resolution. For monochrome (greyscale) content, the perceived resolution may be improved by rendering the monochrome content at "monochrome resolution" under the colour filter. The colour content is rendered at 75 ppi and merged with monochrome content at 150 ppi. This is reasonably effective for black and white text on a monochrome background but has little or no effect on coloured text, black or white text on a coloured background, coloured image or coloured graphics. Accordingly, an improved method is required.

Improved Colour Resolution

In an improved method the filter/colour rendering is controlled by using a mask which comprises a sub-mask for each colour of the filter, for example:

$$\text{Out}(i,j) = Rm(i,j)*I(i,j,R) + Gm(i,j)*I(i,j,G) + Bm(i,j)*I(i,j,B) + Wm(i,j)*I(i,j,W)$$

where i,j are the co-ordinates in the the rows and columns of the pixel matrix, $Rm(i,j)$, $Gm(i,j)$, $Bm(i,j)$, $Wm(i,j)$ are the red, green, blue and white sub-masks, and $I(i,j,R)$, $I(i,j,G)$, $I(i,j,B)$, $I(i,j,W)$ is the red channel, green channel, blue channel and white channel for the input image respectively.

The sub-masks are zero everywhere apart from where the appropriate colour is located.

Figure 7A:
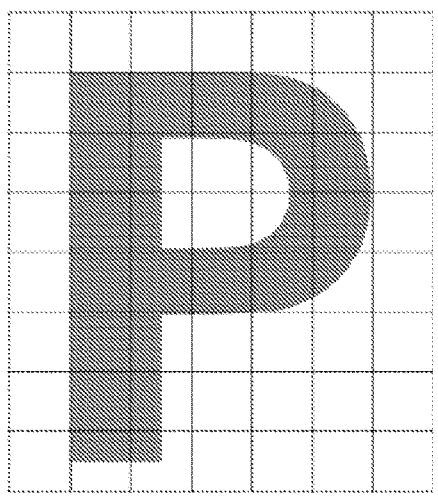
FIGS. 7a to 7c illustrate a first technique for encoding a target image.
Figure 8A:
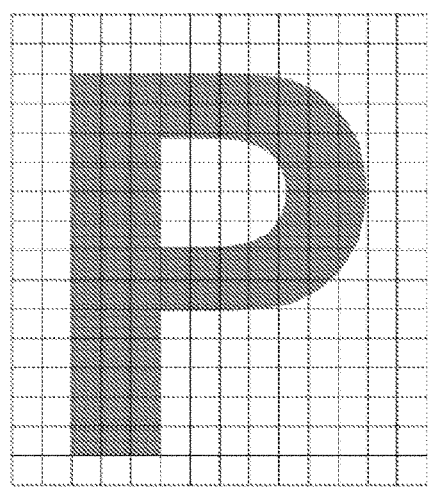
FIGS. 8a to 8c illustrate an improved technique for encoding a target image.

FIGS. 7a and 8a show the same target image (a red "P"). In FIG. 7a, the target image is overlaid with the pixel matrix for the electrophoretic display. Thus, in this example, the pixel matrix has 8 rows and 7 columns. In FIG. 8a, the target image is overlaid with the matrix for the RGBW filter on the electrophoretic display. Accordingly, each pixel in the matrix for FIG. 7a is subdivided into four sub-pixels; one sub-pixel for each of the four colours.

Figure 7B:
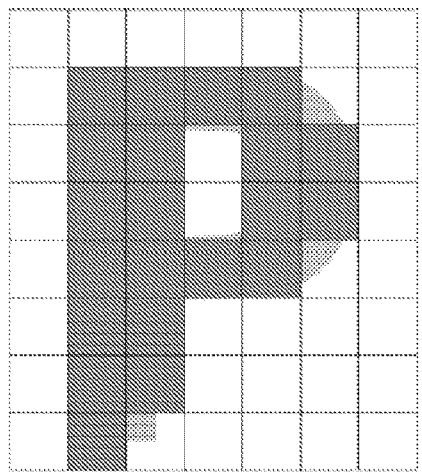

In FIG. 7b, the image is initially rendered to colour resolution. This is achieved by determining whether or not a pixel covers 50% or more of the target image. If this condition is met, the full pixel is shown red. By contrast, in FIG. 8b, the image is initially rendered to greyscale (monochrome) resolution. This is achieved by determining whether or not a sub-pixel covers 50% or more of the target image. If this condition is met, the sub-pixel is shown red.

Figure 8B:
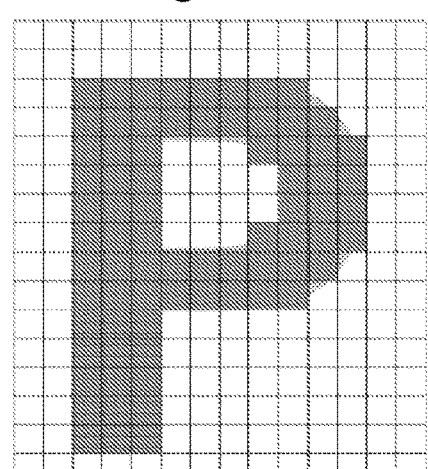
Figure 7C:
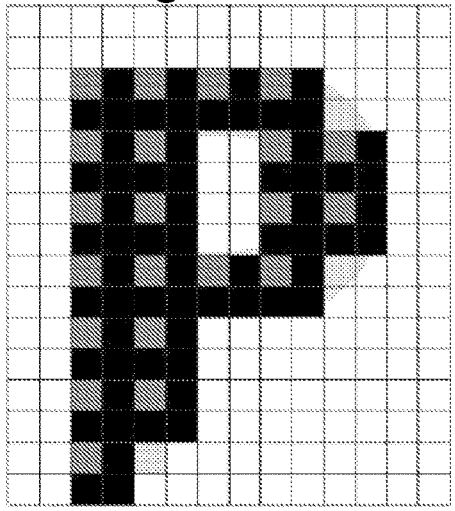
Figure 8C:
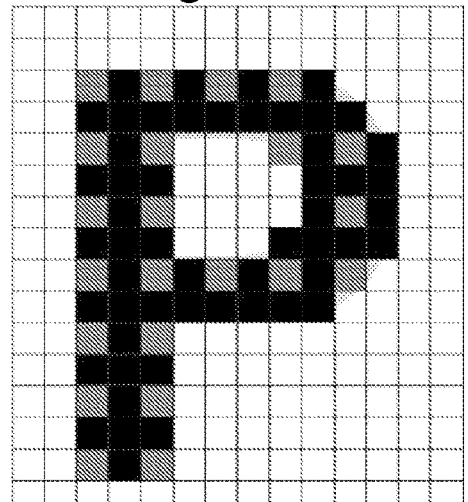

FIGS. 7c and 8c render the results of FIGS. 7b and 8b to the RGBW filter. In FIG. 7c, for each full pixel which is set to red, the sub-pixel red mask is set to 1. For example, for positions (2,1), (2,2) etc, the sub-pixel mask is set to 1 and for positions (1,1), 1,2) etc, the sub-pixel mask is set to 0. In FIG. 8c, the sub-pixel red mask is set to 1, where the sub-pixel corresponding to the location of the red sub-pixel is set to red. Comparing FIGS. 7c and 8c, the different approaches, result in the red sub-pixel mask having positions (6, 4) and (5, 6) set to 1 in FIG. 8c and set to 0 in FIG. 7c. Position (4,5) is set to 0 in FIG. 8c and set to 1 in FIG. 7c. There is thus less error in the method of FIGS. 8a to 8c.

The method of FIGS. 8a to 8c may be considered to encode the brightness information at full colour resolution and overlay the colour at half resolution. In other words, all content is rendered to monochrome resolution and the colour filter is "multiplied" over the top. Anti-aliasing is a known technique which is used to help smooth the appearance of text and graphics. However, one side effect of anti-aliasing is that it reduces sharpness and contrast at the edges of the text or graphics. For clarity, no anti-aliasing is used in either the methods of FIGS. 7a to 7c or 8a to 8c but nonetheless anti-aliasing may also be employed.

Figure 8D:
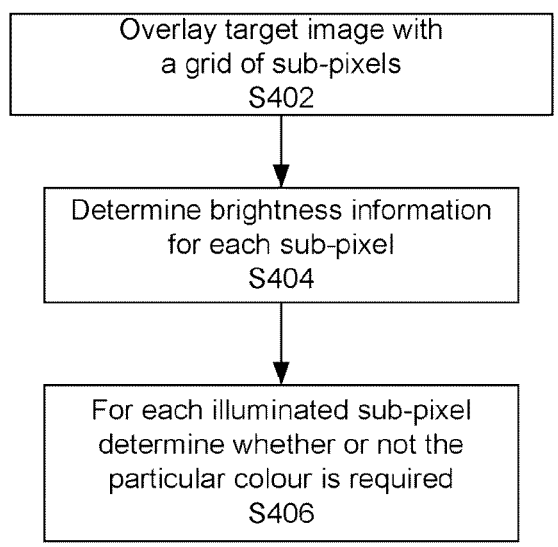
FIG. 8d is a flow chart summarising the steps used in FIGS. 8a to 8c.

The method used in FIGS. 8a to 8c is summarised in FIG. 8d. Once the target image has been received, a first step S402 is to overlay the target image with a grid corresponding to the plurality of sub-pixels within the colour filter. The brightness information for each sub-pixel within the grid is then determined at step S404 to create a brightness image. One example for determining the brightness is to consider whether more than a threshold value (say 50%) of the sub-pixel is bright, e.g. covered either by the target image itself or a non black background. If a sub-pixel covers more than the threshold value, the sub-pixel may be set to full brightness (i.e. white) or partial brightness (e.g. grey to create lighter shades). Otherwise, the brightness is set to black.

Once the brightness information has been encoded at full resolution, step S406 turns to the colour encoding. For each bright (fully or partially) sub-pixel, it is determined whether or not the colour from that sub-pixel is required to give the target to create the output signal. For example, as shown in FIG. 8c, only the red sub-pixels are on, all other sub-pixels are set to zero.

The methodology of FIGS. 8a to 8c is applied to a variety of examples in FIGS. 9a to 15c. In each example, the first Figure shows the target, the second Figure shows the output map (Out(i,j)) and the third Figure shows the resulting image. As will be appreciated, some colour/background combinations will be more effectively represented than others. For example, the cases shown in FIGS. 12a and 15a are not as well represented as the cases of FIGS. 13a and 14a. Accordingly, it may be helpful to combine the methods of the different techniques to improve the performance. For example, the colour of the text or background could be matched to a colour in the look-up table. Alternatively, the different layered approach may be used. One example could be if small red text appears on a dark background, the first step could be to lighten the text to make it more readable before applying the method of FIG. 8d.

In FIGS. 9a and 10a, the target is a black or red square on a white background. FIGS. 9b and 10b show the sub-pixel masks to achieve the target. For the black square, the brightness encoding step results in all sub-pixels within the boundary of the black target having a brightness set to black and the remaining sub-pixels set to full brightness. White is created by all sub-pixels being on and merging to give the appearance of white. Accordingly, the colour resolution step leaves the sub-pixels unchanged. In the resulting mask shown in FIG. 9b, all sub-pixels are at full brightness except for the sub-pixels falling within the boundary of the target square which are black. For the red square, the brightness encoding step results in all sub-pixels within the boundary of the target set to full brightness together with all the remaining sub-pixels set to full brightness. As shown in FIG. 10b, the colour resolution step means that all the bright sub-pixels within the target area which are not red are set to zero and all other sub-pixels are unchanged.

When all sub-pixels for a pixel are on, for example, as with the pixels in the last columns of FIGS. 9c and 10c, the red, green, blue and white will effectively merge to form a white square. The results shown in FIGS. 9c and 10c combine in a user's view to form good approximations to the target image although the edges might be a little coloured.

In FIG. 11a, the target is a magenta image (a "T" shape) on a black background. There is no filter providing magenta but a combination of red and blue provides a good approximation. As shown in FIG. 11b, the brightness encoding step sets all sub-pixels in the background to black and all sub-pixels within the "T" shape are set to full brightness. In the next step, all red and blue sub-pixels within the "T" shape are left unchanged and all white and green pixels within the target area are set to zero. FIG. 11c shows that the resulting image is composed of red and blue sub-pixels falling within the original "T" shape.

In FIGS. 12a and 13a, the target is a red "T" shape on a black or white background, respectively. For FIG. 12a, the brightness encoding step sets all sub-pixels in the background to black and all sub-pixels within the "T" shape are set to full brightness and the colour resolution step sets all the bright sub-pixels which are not red to zero. By contrast, for FIG. 13a, the brightness encoding step sets all sub-pixels to full brightness and the colour resolution step sets all the bright sub-pixels which are within the boundary of the target shape and which are not red to zero. The output to the driver shown in FIG. 12b is relatively simple and has only the red sub-pixels within the "T" shape on; all other sub-pixels are off. Similarly, the result shown in FIG. 12c is relatively simple. The output to the driver shown in FIG. 13b is more complicated because of the need to generate the white background. The same sub-pixels which are on in FIG. 12b are also on in FIG. 13b together with a large number of the background sub-pixels. The key shaped pattern provided to the driver results in a more complicated pattern of sub-pixels shown in FIG. 13c.

In FIGS. 14a and 15a, the targets have the same shape and backgrounds to those of FIGS. 12a and 13a. However, in this example, the red is much lighter. For FIG. 14a, the brightness encoding step sets all sub-pixels in the background to black and all sub-pixels within the "T" shape are set to partial brightness. The subsequent colour resolution step leaves all the bright sub-pixels which are not red unchanged but changes the red sub-pixels to full brightness. By contrast, for FIG. 15a, the brightness encoding step sets all sub-pixels in the background to full brightness and all sub-pixels within the "T" shape are set to partial brightness. The subsequent colour resolution step leaves all the partially bright sub-pixels which are not red unchanged but changes the partially red sub-pixels to full brightness. As shown in FIGS. 14b and 15b, some of the sub-pixels are set at an intensity which is between 0 and 1, in other words, the sub-pixels are partially activated (illustrated as grey). The mask pattern for FIG. 15b corresponds to that of FIG. 13b with all "off" sub-pixels replaced with "partially on" sub-pixels.

FIGS. 16a to 16d show real examples of the application of the methods of FIGS. 7a to 7c and 8a to 8c respectively. In FIG. 16a, two bar charts having white text on coloured backgrounds are rendered using the method of FIGS. 7a to 7c. As shown, the text is blurred. By contrast, when using the method of FIGS. 8a to 8c, the white text is rendered more sharply as shown in FIG. 16b. A similar improvement is achieved with coloured text on a white background as shown in FIGS. 16c and 16d.

Improved Colour Reproduction on High Resolution Displays

We now describe an example of a high resolution colour electronic paper display with improved colour performance, according to an embodiment of the invention.

Thus referring next to FIGS. 17a to 17c, FIG. 17a shows the letter "P" superimposed on a "half resolution" display. On the left is the target image in red, in the centre an aliased version of the image superimposed on the native pixels of the display prior to overlaying with a colour filter as previously described, and on the right the set of pixels—shown in red—selected for display after masking with a mask defining locations of the red colour filter elements. Square 1700 illustrates a pixel of the colour filter comprising four coloured filter elements, red, green, blue and white (only one of which is visible in the red image of FIG. 17a). Each of these four coloured filter elements defines a sub-pixel of the coloured filter and the set of four elements defines a pixel of the colour filter.

In FIG. 17b a "full" resolution display is employed (that is a display with twice the resolution of that illustrated in FIG. 17a) with a full resolution colour filter—that is with colour filter sub-pixels which are the same size as the native display pixels. Again the letter "P" is overlaid on the display and square 1702 illustrates a colour pixel comprising four colour filter sub-pixels which are each half the size (linear dimension) of those of FIG. 17a.

In FIG. 17c a display of the same "full" resolution as in FIG. 17b is depicted, but a half resolution colour filter is employed. Thus square 1704 illustrates a colour filter pixel comprising four sub-pixels each of which overlays four native display pixels. Thus although the underlying native display resolution is the same as in FIG. 17b, and although the letter "P" in the red colour plane is rendered at the same resolution as in FIG. 17b on the underlying native display pixels, the (maximum) spatial frequency at which the "colour" of a pixel changes from one pixel to the next is halved by comparison with FIG. 17b.

This is illustrated in the waveforms accompanying FIGS. 17a to 17c. These show, schematically, the gate/source data modulation on the pixels along the lines indicated by respective arrow. A tall vertical bar indicates an "on" pixel and a short bar an "off" pixel (in practice the drive waveforms may be more complex since the drive to a pixel may, for example, depend upon the previous history of drive to that pixel). The horizontal axis in the waveforms corresponds to spatial position, or equivalently time, if the pixels are accessed sequentially. As can be seen, for equal space/time increments corresponding to the pitch of a pixel at "full" resolution, the waveforms of FIGS. 17a and 17c show colour data which changes half as fast as that in the waveform of FIG. 17b. However in the waveform of FIG. 17c the underlying spatial resolution is doubled—thus increasing the effective spatial resolution where a colour plane is rendered at full resolution and then afterwards the colour filter overlaid at half resolution.

Thus in the approach of FIG. 17c a colour filter sub-pixel overlies at least two native display pixels, preferably in each of the two orthogonal row and column directions, to effectively halve the maximum spatial frequency of the colour modulation. Thus, for example, for a native pixel picture 100 μm in each dimension, each colour filter sub-pixel may have a pitch of 200 μm, so that four high resolution pixels reside under each individual coloured filter element. It will be recognised that in practice the size of a coloured filter element may be any whole multiple (greater than two) of the native display pixel pitch. Similarly although in the illustrated example a colour filter pixel comprises a square layout of four different coloured filter sub-pixels other configurations of the colour filter sub-pixels are also possible, for example an in-line arrangement.

Figure 18A:
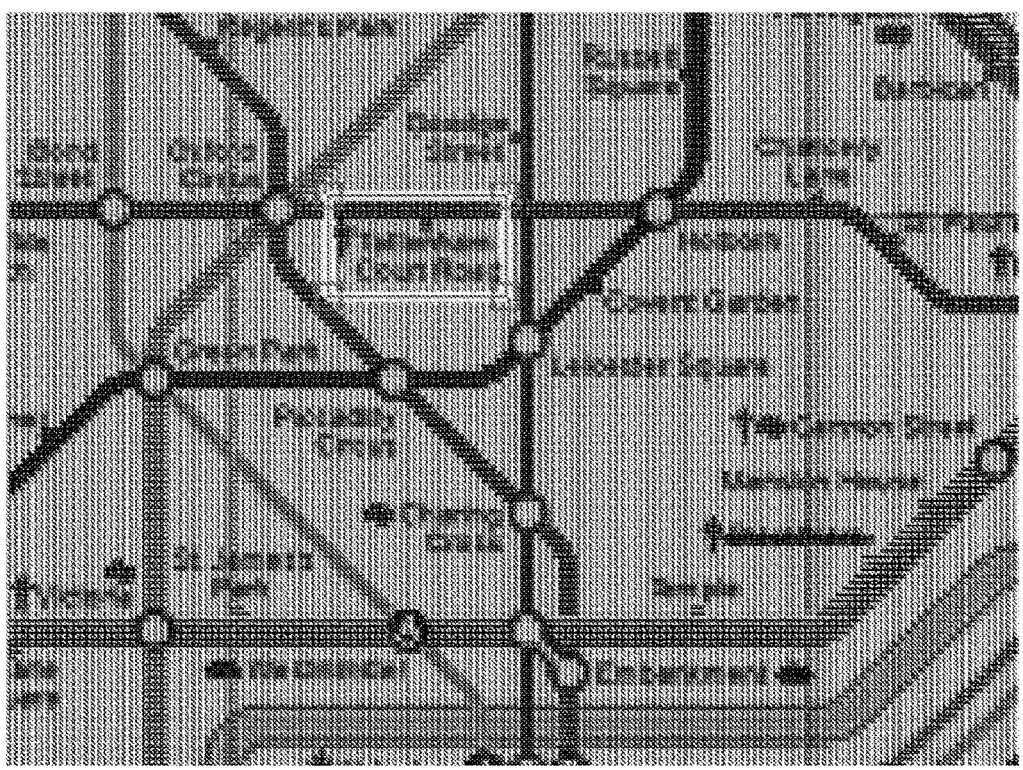
FIGS. 18a to 18d show example normal and zoomed display regions for displays driven according to the schemes of FIGS. 17a and 17c respectively.
Figure 18B:
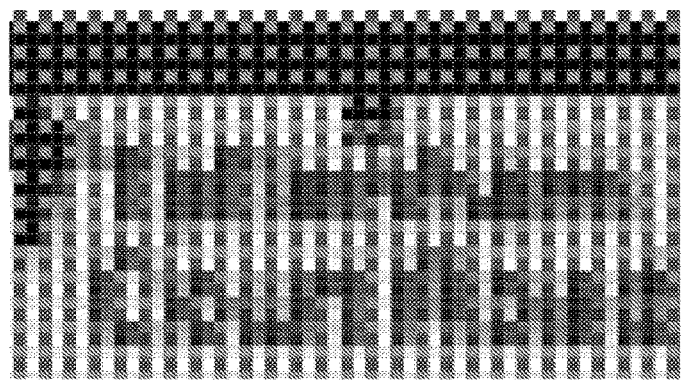
Figure 18C:
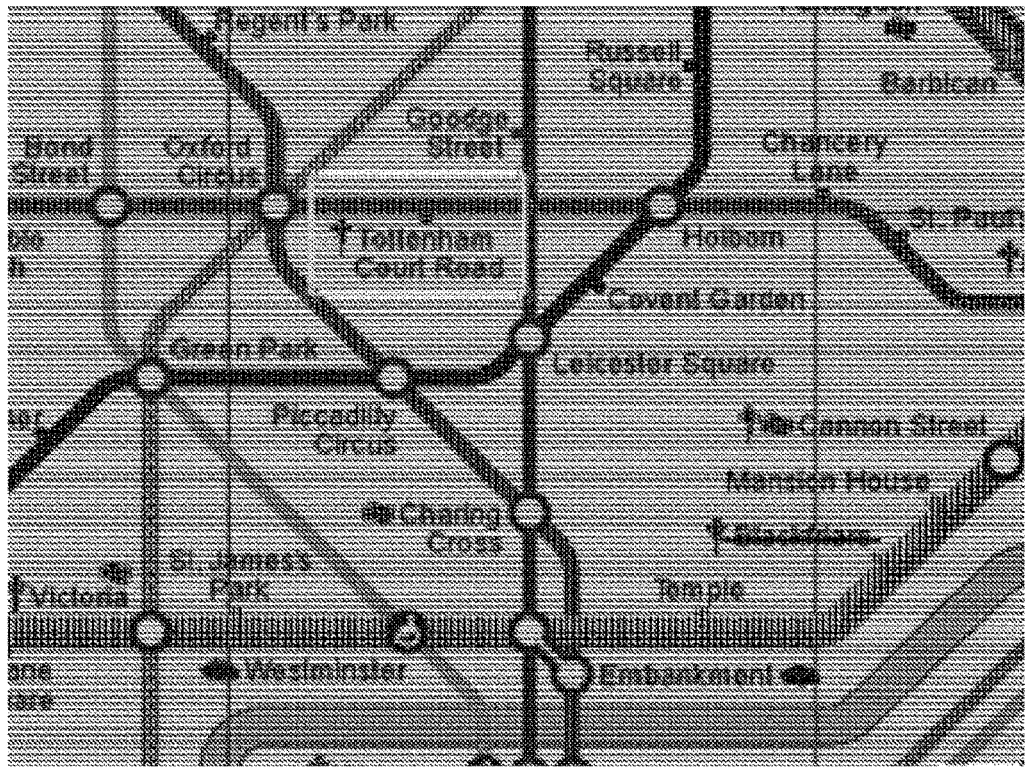
Figure 18D:

FIG. 18a illustrates a coloured image represented using the approach of FIG. 17a, FIG. 18b illustrating an enlargement of the highlighted region of FIG. 18a. FIG. 18c illustrates the approach of FIG. 17c, with FIG. 18d showing an enlargement of the highlighted region of FIG. 18c. It is clear that the approach of FIG. 17c gives the appearance of a much higher resolution display, but with the colour reproduction (brightness, maximum spatial frequency) of the approach of FIG. 17a. This demonstrates that embodiments of the invention can achieve both high resolution and high quality colour reproduction.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of displaying colour data on an electronic paper display, the method comprising:
   providing an electronic paper display having display pixels at a display pixel pitch;
   providing a colour filter for said display, said colour filter comprising groups of coloured filter elements, each said coloured filter element having one of a plurality of different colours, wherein each group of coloured filter elements defines a pattern of said coloured filter elements, and wherein in said pattern a coloured filter element overlies an integral number, n, of said display pixels, where n is two or more;
   providing colour image data defining a plurality of colour image planes, one for each of said different colours, wherein data in a said colour image plane comprises image pixel data defining values for image pixels corresponding to said display pixels;
   selecting, from said data in each said colour image plane, data for image pixels corresponding to display pixels over which the filter elements of the respective colour for the colour plane lie;
   using said selected data to drive said electronic paper display;
   wherein on said display a rate of spatial variation of said selected data for said image pixels is less than said display pixel pitch; and
   combining said selected data for a set, c, comprising c different colour planes of said plurality of different said colour planes, and driving a row of said display using said combined data; wherein a ratio of said spatial variation of said selected data for one of said colours along said row is $$\frac{1}{n \times c}$$

of a rate of spatial variation defined by said pitch of said display pixels along said row.

2. A method as claimed in claim 1 comprising four different said colour planes, with c=2 of said colour planes combined along said row, wherein said coloured filter element overlies n=2 said display pixels along said row, and wherein said ratio of said spatial variation of said selected data for one of said colour planes combined along said row is one half of said rate of spatial variation defined by said pitch of said display pixels along said row.

3. A method as claimed in claim 1 wherein selecting comprises determining combined output data for a row of said display Out(i,j) using:

$$Out(i,j)=Rm(i,j)*I(i,j,R)+Gm(i,j)*I(i,j,G)+Bm(i,j)*I(i,j,B)+Wm(i,j)*I(i,j,W)$$

where i,j define row and column display pixel coordinates, I(i,j,R), I(i,j,G), I(i,j,B), I(i,j,W) are red, green, blue, and white colour image plane data, and Rm(i,j), Gm(i,j), Bm(i,j), Wm(i,j) are respectively red, green, blue and white colour masks representing coordinates of respective red, green, blue and white said coloured filter elements.

4. A method as claimed in claim 1 further comprising receiving electronic document data, and rendering content of said electronic document data for display at a spatial resolution of said display pixels by converting said electronic document data to said colour image data such that each colour plane of said colour image data defines data at said spatial resolution of said display pixels.

5. A method as claimed in claim 1 wherein said different colours include white.

6. A method as claimed in claim 1 wherein said colour filter pattern comprises a pattern of four display pixels by four display pixels comprising four squares, each of four display pixels, each square defining a different said colour for a said coloured filter element.

7. A method as recited in claim 1 wherein said electronic paper display is an electrophoretic display.

8. A method as recited in claim 1, wherein said electronic paper display comprises a flexible display having a backplane comprising an active matrix of organic field effect transistors, and wherein pixels of said display are driven by drain/source connections of said transistors with respect to a common pixel electrode of said backplane.

9. An electronic paper display comprising:
display pixels at a display pixel pitch;
a colour filter for said display, said colour filter comprising groups of coloured filter elements, and each said coloured filter element having one of a plurality of different colours, and
a controller comprising:
an input to receive colour image data defining a plurality of colour image planes, one for each of said different colours, wherein data in a said colour image plane comprises image pixel data defining values for image pixels corresponding to said display pixels;
a system to select, from said data in each said colour image plane, data for image pixels corresponding to display pixels over which the filter elements of the respective colour for the colour plane lie; and
an output to combine said selected data into row/column data for driving pixels of said electronic paper display;
wherein on said display, when driven, a rate of spatial variation of said selected data for said image pixels is less than said display pixel pitch,
wherein each group of coloured filter elements defines a pattern of said coloured filter elements,
wherein in said pattern a coloured filter element overlies an integral number, n, of said display pixels, where n is two or more, and
wherein said selected data is combined for a set, c, comprising c different colour planes of said plurality of different said colour image planes, and a row of said display is driven using said combined data; wherein a ratio of said spatial variation of said selected data for one of said colours along said row is $$\frac{1}{n \times c}$$

or a rate of spatial variation defined by said pitch of said display pixels along said row.

10. An electronic paper display as claimed in claim 9, wherein said colour filter pattern comprises a pattern of four display pixels by four display pixels comprising four squares, each of four display pixels, each square defining a different said colour for a said coloured filter element.

11. An electronic paper display as claimed in claim 9, further comprising a driver to provide waveforms for driving said electronic paper display.

12. An electronic paper display as claimed in claim 9, wherein said electronic paper display is an electrophoretic display.

13. An electronic paper display as claimed in claim 9, further comprising a flexible display having a backplane comprising an active matrix of organic field effect transistors, and wherein pixels of said display are driven by drain/source connections of said transistors with respect to a common pixel electrode of said backplane.

14. A consumer electronic device, in particular an electronic document reading device, incorporating a display as recited in claim 9.

15. A display as recited in claim 9 wherein said electronic paper display is an electrophoretic display.

16. A display as recited in claim 9, wherein said electronic paper display comprises a flexible display having a backplane comprising an active matrix of organic field effect transistors, and wherein pixels of said display are driven by drain/source connections of said transistors with respect to a common pixel electrode of said backplane.

* * * * *